(12) United States Patent
Henkel et al.

(10) Patent No.: US 12,139,006 B2
(45) Date of Patent: Nov. 12, 2024

(54) DRIVE DEVICE WITH SELF-CONTROLLED COOLING

(71) Applicant: Robert Bosch GmbH, Stuttgart (DE)

(72) Inventors: Achim Henkel, Stuttgart (DE); Manuel Warwel, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 17/801,329

(22) PCT Filed: Feb. 17, 2021

(86) PCT No.: PCT/EP2021/053843
§ 371 (c)(1),
(2) Date: Aug. 22, 2022

(87) PCT Pub. No.: WO2021/165294
PCT Pub. Date: Aug. 26, 2021

(65) Prior Publication Data
US 2023/0083635 A1    Mar. 16, 2023

(30) Foreign Application Priority Data

Feb. 20, 2020   (DE) .................... 10 2020 202 203.8

(51) Int. Cl.
*B60K 11/02* (2006.01)
*B60K 1/00* (2006.01)

(52) U.S. Cl.
CPC ........ *B60K 11/02* (2013.01); *B60K 2001/001* (2013.01); *B60K 2001/006* (2013.01);
(Continued)

(58) Field of Classification Search
CPC .............. B60K 11/02; B60K 2001/001; B60K 2001/006; B60Y 2200/91; B60Y 2306/05; B60Y 2400/61
See application file for complete search history.

(56) References Cited

U.S. PATENT DOCUMENTS 8,030,863 B2 * 10/2011 Yoshida ................. B60K 11/00
318/599
8,583,310 B2 * 11/2013 Hashimoto ............. B60L 50/51
180/65.21
(Continued)

FOREIGN PATENT DOCUMENTS

DE    102013204784 A1    9/2014
DE    102013218126 A1    3/2015
(Continued)

OTHER PUBLICATIONS

Motown21, "The 76th Toyota Aqua HV System," <http://www.motown21.com/Tech/Trend_76/index.php> 2012 (14 pages including machine English translation).
(Continued)

*Primary Examiner* — John D Walters
(74) *Attorney, Agent, or Firm* — Michael Best & Friedrich LLP

(57) ABSTRACT

A drive device is disclosed, in particular for an electrically driveable vehicle, having at least one electric motor, having at least one drive inverter for actuating the electric motor, having at least one cooling unit with at least one coolant pump, a cooler, at least one pump inverter and with at least one heat exchanger, wherein the heat exchanger is connected in fluid-conducting fashion to the coolant pump and to the cooler via a coolant circuit, wherein at least one pump inverter is integrated into the drive inverter or is arranged adjacent to the drive inverter, wherein the coolant pump can be actuated by the pump inverter.

8 Claims, 4 Drawing Sheets

(52) U.S. Cl.
CPC ....... *B60Y 2200/91* (2013.01); *B60Y 2306/05* (2013.01); *B60Y 2400/61* (2013.01)

(56) References Cited

U.S. PATENT DOCUMENTS

| | | | |
|---|---|---|---|
| 8,639,404 B2* | 1/2014 | Sugiyama | B66C 1/06 |
| | | | 701/50 |
| 10,742,091 B2* | 8/2020 | Honjo | H02K 9/193 |
| 10,906,373 B2* | 2/2021 | Oh | B60H 1/00914 |
| 2009/0289583 A1 | 11/2009 | Yoshida | |
| 2012/0130576 A1 | 5/2012 | Sugiyama et al. | |
| 2013/0116871 A1 | 5/2013 | Hashimoto | |
| 2018/0339583 A1 | 11/2018 | Hira | |
| 2019/0260272 A1 | 8/2019 | Honjo | |
| 2020/0031191 A1 | 1/2020 | Oh et al. | |

FOREIGN PATENT DOCUMENTS

| | | | |
|---|---|---|---|
| EP | 2781381 B1 | 6/2017 | |
| JP | 2008256313 A | 10/2008 | |

OTHER PUBLICATIONS

Translation of International Search Report for Application No. PCT/EP2021/053843 dated May 18, 2021 (2 pages).

\* cited by examiner

DRIVE DEVICE WITH SELF-CONTROLLED COOLING

The present application is a 371 National Phase of International Application No. PCT/EP2021/053843, filed on 17 Feb. 2021, which claims priority to German Application No. 102020202203.8, filed on 20 Feb. 2020.

BACKGROUND OF THE INVENTION

The invention relates to a drive device, in particular for an electrically driveable vehicle, having at least one electric motor, having at least one drive inverter for actuating the electric motor, and having at least one cooling unit with at least one coolant pump, a cooler, at least one pump inverter and with at least one heat exchanger.

Electric drives are becoming increasingly important for the motorization of vehicles. During operation, electric motors generate power loss which has to be discharged in the form of heat from the electric motor and the corresponding power electronics or inverters. Particularly in the case of powerful electric motors, external cooling of the components of the electric drive is necessary in order to allow operation of the components within their specification.

The external cooling usually involves coolant pumps which are actuated and supplied with electrical power via separate data and supply lines. In order to increase the overall efficiency of the vehicle, coolant pumps are actuated as needed. As a result, given a high power requirement from the electric drive, increased cooling power may also be demanded from the coolant pump. Such optimization of the provided cooling power at the vehicle level is often complicated and technically complex. Furthermore, the assembly work for electrically connecting the cooling arrangement to a central control device is cumbersome.

SUMMARY OF THE INVENTION

The problem on which the invention is based can be considered that of proposing a drive device with a cost-efficient and compact cooling arrangement.

One aspect of the invention provides a drive device, in particular for an electrically driveable vehicle. The drive device has at least one electric motor and at least one drive inverter for actuating the electric motor.

Furthermore, at least one cooling unit with at least one coolant pump, a cooler, at least one pump inverter and with at least one heat exchanger is provided. The heat exchanger is connected in a fluid-conducting fashion to the coolant pump and the cooler via a coolant circuit.

At least one pump inverter is preferably integrated into the drive inverter or arranged adjacent to the drive inverter, wherein the coolant pump can be actuated by the pump inverter.

The drive device therefore combines assemblies from the drive train with assemblies from the HVAC/cooling domain. As a result, a lower-cost overall system and vehicle can be provided. In this case, the drive inverter can undertake actuation of the coolant pump of the electric drive. This is done by integrating the corresponding pump inverter or inverters into the drive inverter or the arrangement of pump inverters next to the drive inverter.

The drive inverter is designed to actuate the at least one electric motor and can convert the DC voltage of the traction battery or a DC voltage source in order to operate the electric motor. For example, the drive inverter can transform DC voltage into AC voltage in order to actuate the electric motor via three or six phases. In this case, the drive inverter can have a data interface by way of which, for example, a power requirement can be communicated to the drive inverter.

The pump inverter can actuate one or more coolant pumps and therefore allow the coolant to be conveyed into the coolant circuit. In this case, the pump inverter can set a higher or lower volume flow of the coolant depending on the power demanded by the drive components.

An electric axle with self-controlled or self-managed cooling can be implemented by the drive device according to the invention. In particular, synergies in power and/or data supply are created since these are supplied centrally from the axle-side or electric motor-side drive inverter.

The integration of cooling assembly actuation into the drive inverter renders the drive inverter an inherently closed, easily applicable system. In particular, the technically complex implementation of communication of the coolant flow volume between the coolant pump, a central control device and the drive components can be dispensed with. The drive components, such as the electric motor and the drive inverter for example, can therefore provide for their own cooling and in this way undertake thermal, electrical and mechanical control in an electric vehicle. This creates a multifunctional drive device which can be independently designed for torque control (traction and deceleration by recuperation).

The drive device designed as one unit can have the data interface as the essential interface for superordinate vehicle control. Lateral target specifications, such as torque specifications, force specifications or acceleration specifications for example, can be exchanged with a central vehicle controller via the data interface.

A further advantage can be found in the reduction in cabling complexity owing to the data lines and the energy supply lines of the at least one cooling unit being dispensed with. The coolant pump can be electrically connected via a central data and energy supply of the drive components. In this case, optimized spatial arrangement of the drive inverter, the electric motor and the inverter can allow common use of a cooling area in order to simplify the thermal design of the pump inverter and the drive device.

Furthermore, the expenditure on assembly of the drive device can be reduced owing to the integration of the pump inverter into the drive inverter. Here, the components can be secured with a smaller number of screw points and take up less installation space in the vehicle.

The drive device can preferably be used in an electrically driveable vehicle. A vehicle of this kind may be, for example, an electric vehicle or a hybrid vehicle.

The vehicle can be operable in an assisted, partially automated, highly automated and/or fully automated or driverless manner in accordance with the BASt (German Federal Highway Research Institute) standard.

The vehicle can be, for example, a passenger car, a truck, a robotaxi and the like. The vehicle is not limited to operation on roads. Rather, the vehicle can also be designed as a watercraft, aircraft, such as a transportation drone for example, and the like.

In one exemplary embodiment, the electric motor and the drive inverter are designed as an electric axle. As an alternative or in addition, a transmission of the electric motor can also be integrated into the electric axle or e-axle. The drive device can therefore be embodied as a self-cooling e-axle which is able to internally optimize cooling in accordance with requirements.

Owing to this measure, the energy consumption by the coolant pump can be minimized and the self-protection or the service life of the cooled drive components can be increased.

According to a further embodiment, the pump inverter is arranged in a common housing of the drive inverter. Spatial coupling of the drive inverter and the pump inverter can be implemented in this way. Owing to this spatial coupling, synergies in thermal regulation of the inverters, for example by way of common heat sinks, can be utilized.

Furthermore, functional coupling of the inverters can be implemented. The functional coupling can be used to employ electronic components, such as microprocessors and ASIC protection circuitry for example, jointly for several inverters.

According to a further exemplary embodiment, the coolant pump is arranged adjacent to the electric motor and/or the drive inverter. The coolant pump can be spatially associated with the drive components and the pump inverter in this way. In this case, coolant lines and electrical lines can be shortened and the expenditure on assembly of the drive device can be reduced.

According to a further embodiment, the electric motor, the drive inverter and/or the pump inverter have a common heat exchanger which is connected in a fluid-conducting fashion to the coolant pump. A technically particularly simple drive device can be provided owing to this measure. All the drive components or only the pump inverters with the drive inverter can use a common heat exchanger and/or a common cooling area and therefore reduce the complexity of the thermal management system.

According to a further exemplary embodiment, the drive inverter and the at least one pump inverter are thermally connected to a common heat exchanger or to separate heat exchangers. The two inverters can therefore use a common cooler or heat exchanger. As an alternative or in addition, separate heat sinks with different cooling circuit temperatures can be provided depending on the operating temperatures of the inverters.

The respective coolant circuits can be decoupled from one another. In this case, each inverter can have its own coolant circuit.

According to a further embodiment, the electric motor is thermally coupled to a first heat exchanger which is connected in a fluid-conducting fashion to a first cooling unit via a first coolant circuit.

The drive inverter and/or at least one pump inverter are preferably thermally coupled to at least one second heat exchanger which is connected in a fluid-conducting fashion to a second cooling unit via a second coolant circuit. In this refinement, the at least one electric motor can be thermally regulated by a cooling unit which differs from a cooling unit of the inverters. Different temperature levels for the electric motor and for the power electronics for actuating the electric motor and the pump motor, in the form of the drive inverter and the pump inverter, can be implemented owing to this measure. For example, the electric motor can be operated at a higher temperature level than the power electronics. Therefore, cooling of the drive device can be particularly efficient.

According to a further exemplary embodiment, the at least one coolant circuit contains a coolant, wherein the coolant is in the form of an oil, water, air or an aqueous solution. The thermal regulation of the drive components can be implemented in a particularly versatile fashion in this way.

For example, the electric motor can be cooled using a cooling medium that is different from the inverters.

The different coolant circuits can contain the same or different coolants.

BRIEF DESCRIPTION OF THE DRAWINGS

Preferred exemplary embodiments of the invention will be explained in more detail below with reference to highly simplified schematic illustrations. In the drawing.

DETAILED DESCRIPTION

Figure 1:
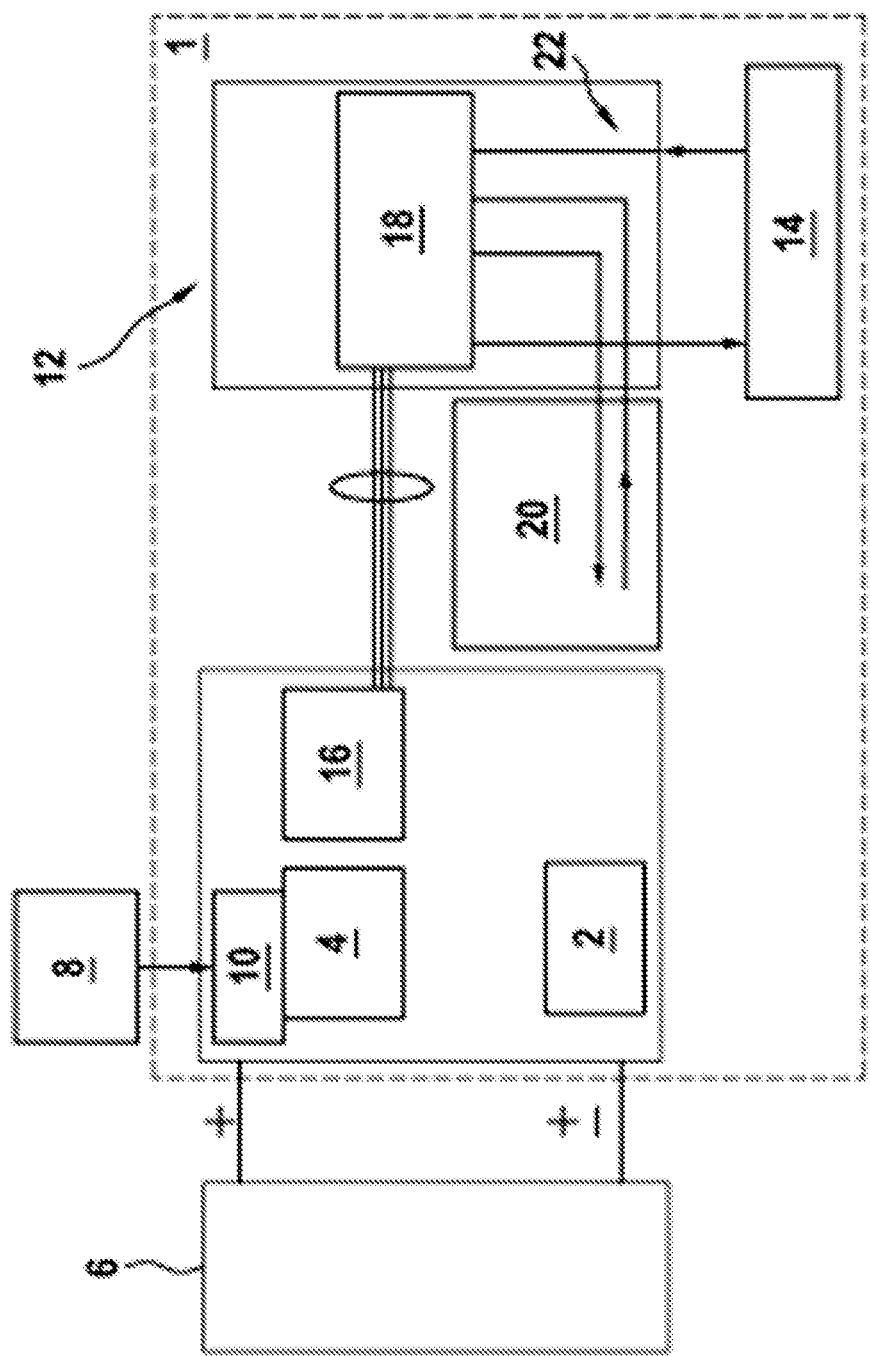
FIG. 1 shows a schematic illustration of a drive device according to one embodiment.

FIG. 1 shows a schematic illustration of a drive device 1 according to one embodiment. The drive device 1 can be used in an electrically driveable vehicle, such as an electric vehicle or a hybrid vehicle for example.

The drive device 1 illustrated in the exemplary embodiment has an electric motor 2 and a drive inverter 4 for actuating the electric motor 2.

The drive inverter 4 can provide the electrical energy provided by a traction battery 6 to the electric motor 2 and regulate said electrical energy. For example, the drive inverter 4 can provide energy, provided as DC voltage, from the traction battery 6 in the form of DC voltage to the electric motor 2.

The drive device 1 can have a data interface 10 as an interface to a superordinate vehicle controller 8. Lateral target specifications, such as torque specifications, force specifications or acceleration specifications for example, can be exchanged with a central vehicle controller 8 via the data interface 10.

Furthermore, the drive device 1 has a cooling unit 12. The cooling unit 12 can have, for example, a cooler 14, a pump inverter 16 and a coolant pump 18.

The pump inverter 16 serves to actuate the coolant pump 18 and is preferably integrated into the drive inverter 4 or arranged adjacent to the drive inverter 4.

The electric motor 2, the drive inverter 4 and the pump inverter 16 can be designed as one unit, such as an electric axle for example.

The coolant pump 18 can convey a coolant in a coolant circuit 22. The coolant circuit 22 connects the coolant pump 18 to the cooler 14 and to a heat exchanger 20.

The heat exchanger 20 is designed to transport lost power and waste heat from the drive inverter 4, the electric motor 2 and the pump inverter 16 into the coolant. The heat absorbed by the coolant can then be given off in the cooler 14.

Owing to the integration of the pump inverter 16 into the electric axle, said pump inverter can also be supplied by way of the connections of the drive inverter 4. Furthermore, the power requirement of the coolant pump 18 can be ascertained directly at the electric axle to be cooled. The coolant pump 18 is actuated directly by the pump inverter 16.

The coolant in the coolant circuit 22 can be, for example, an aqueous solution.

Figure 2:
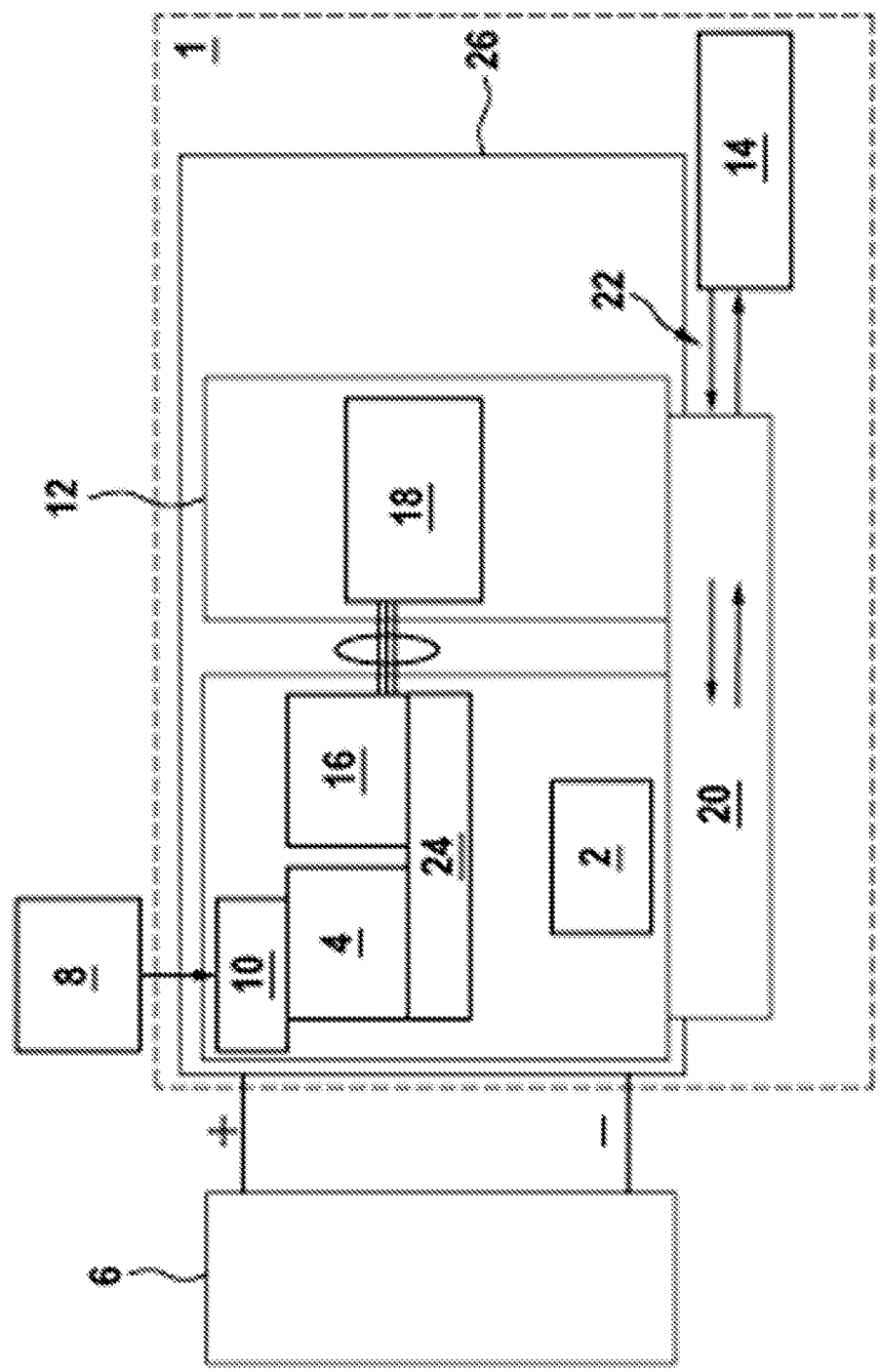
FIG. 2 shows a schematic illustration of a drive device according to a further embodiment.

FIG. 2 shows a schematic illustration of a drive device 1 according to a further embodiment. In contrast to the drive device 1 shown in FIG. 1, the drive inverter 4 and the pump inverter 16 are arranged on a common cooling plate 24 in order to allow simplified thermal management of the power electronics of the drive inverter 4 and the pump inverter 16.

Furthermore, the drive device 1 has an arrangement of the cooling unit 12 and the electric axle 4, 2, 16 in a common housing 26 in the illustrated exemplary embodiment. In this way, the entire drive device 1 can be designed as one unit which can be assembled in a simplified manner.

Figure 3:
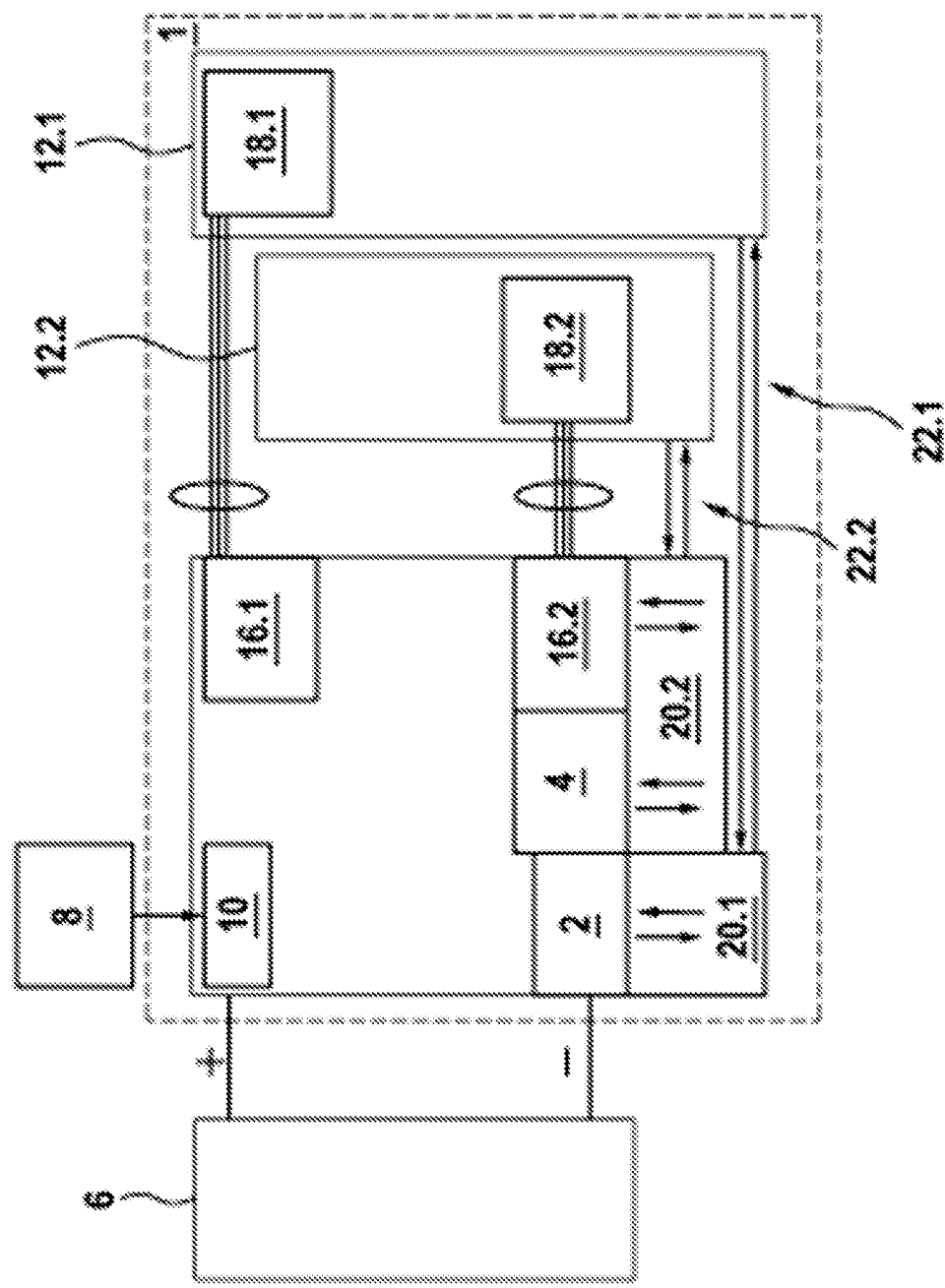
FIG. 3 shows a schematic illustration of a drive device with separate coolant circuits according to one embodiment.

FIG. 3 shows a schematic illustration of a drive device 1 with separate coolant circuits 22.1, 22.2 according to one embodiment.

The electric motor 2 is thermally coupled to a first heat exchanger 20.1 which is connected in a fluid-conducting fashion to a first cooling unit 12.1 via a first coolant circuit 22.1. The first heat exchanger 20.1 is supplied with coolant via a first cooling unit 12.1. In this case, a first coolant pump 18.1 conveys the coolant in the first coolant circuit 22.1.

A second coolant circuit 22.2 is operated via a second cooling unit 12.2 with a second coolant pump 18.2. In this case, a second heat exchanger 20.2 is connected in a fluid-conducting fashion to the second coolant circuit 22.2.

The first coolant pump 18.1 is actuated and supplied with electrical energy by a first pump inverter 16.1 and the second coolant pump 18.2 is actuated and supplied with electrical energy by a second pump inverter 16.2.

The first cooling unit 12.1 can set a first temperature level or heat transfer in the first heat exchanger 20.1 for thermally regulating the electric motor 2 using the first coolant circuit 22.1.

The second cooling unit 12.2 can set a second temperature level or heat transfer in the second heat exchanger 20.2 for thermally regulating the drive inverter 4 and the second pump inverter 16.2 using the second coolant circuit 22.2. The first pump inverter 16.1 can likewise be cooled by the second heat exchanger 20.2 here.

In principle, the heat exchangers 20 are not only suitable for cooling components. Depending on the design of the drive device 1, the heat exchangers 20 can also be used to heat up the components in order to allow operation of the components within optimal specifications.

Figure 4:
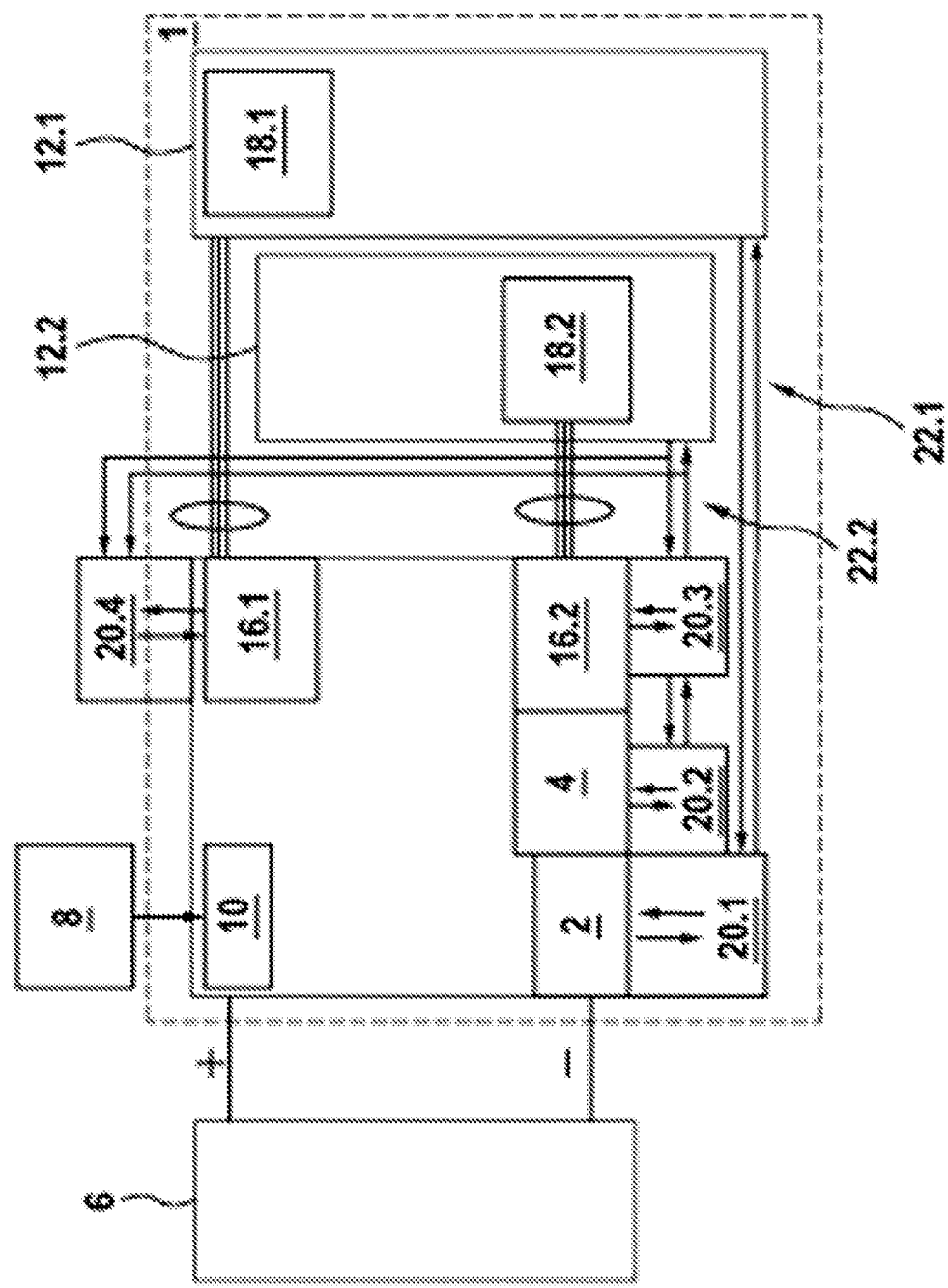
FIG. 4 shows a schematic illustration of a drive device with separate coolant circuits according to a further embodiment.

FIG. 4 shows a schematic illustration of a drive device 1 with separate coolant circuits 22.1, 22.2 according to a further embodiment. In contrast to the exemplary embodiment shown in FIG. 3, the drive device 1 has a separate heat exchanger 20.2, 20.3, 20.4 for each inverter 4, 16.1, 16.2. The heat exchangers 20.2, 20.3, 20.4 are all connected in a fluid-conducting fashion to the second coolant circuit 22.2.

For reasons of clarity, no coolers 14 are shown in FIG. 3 or FIG. 4.

According to an alternative refinement, a plurality of coolant circuits which are decoupled from one another can also be used in order to cool different inverters 4, 16.1, 16.2. For example, each inverter 4, 16.1, 16.2 can be cooled by a heat exchanger 20.2, 20.3, 20.4 which is coupled in a fluid-conducting fashion to a separate coolant circuit in each case.

The invention claimed is:

1. A drive device (1) for an electric vehicle, the drive device comprising:
   at least one electric motor (2),
   at least one drive inverter (4) for actuating the electric motor (2),
   at least one cooling unit (12) with at least one coolant pump (18), a cooler (14), at least one pump inverter (16) and with at least one heat exchanger (20), wherein the heat exchanger (20) is connected in a fluid-conducting fashion to the coolant pump (18) and the cooler (14) via a coolant circuit (22),
   wherein at least one pump inverter (16) is integrated into the drive inverter (4) or arranged adjacent to the drive inverter (4), wherein the coolant pump (18) is configured to be actuated by the pump inverter (16).

2. The drive device as claimed in claim 1, wherein the electric motor (2) and the drive inverter (4) or the electric motor (2), the drive inverter (4) and a transmission are configured as an electric axle.

3. The drive device as claimed in claim 1, wherein the pump inverter (16) is arranged in a common housing (26) of the drive inverter (4).

4. The drive device as claimed in claim 1, wherein the coolant pump (18) is arranged adjacent to the electric motor (2) and/or the drive inverter (4).

5. The drive device as claimed in claim 1, wherein the electric motor (2), the drive inverter (4) and/or the pump inverter (16) have a common heat exchanger (20) which is connected in a fluid-conducting fashion to the coolant pump (18).

6. The drive device as claimed in claim 1, wherein the drive inverter (4) and the at least one pump inverter (16) are thermally connected to a common heat exchanger (20.2) or to separate heat exchangers (20.2, 20.3, 20.4).

7. The drive device as claimed in claim 1, wherein the electric motor (2) is thermally coupled to a first heat exchanger (20.1) which is connected in a fluid-conducting fashion to a first cooling unit (12.1) via a first coolant circuit (22.1), wherein the drive inverter (4) and/or at least one pump inverter (16) are/is thermally coupled to at least one second heat exchanger (20.2) which is connected in a fluid-conducting fashion to a second cooling unit (12.2) via a second coolant circuit (22.2).

8. The drive device as claimed in claim 1, wherein the at least one coolant circuit (22) contains a coolant, wherein the coolant is an oil, water, air or an aqueous solution.

* * * * *